(12) United States Patent  
Opatril

(10) Patent No.: US 7,674,077 B2  
(45) Date of Patent: Mar. 9, 2010

(54) METHOD OF TRANSPORTING TUBEROUS VEGETABLES

(75) Inventor: Michael Opatril, Glyndon, MN (US)

(73) Assignee: Agassiz Fieldstone, Inc., Glyndon, MN (US)

( * ) Notice: Subject to any disclaimer, the term of this patent is extended or adjusted under 35 U.S.C. 154(b) by 0 days.

(21) Appl. No.: 11/949,894

(22) Filed: Dec. 4, 2007

(65) Prior Publication Data

US 2009/0142146 A1 Jun. 4, 2009

(51) Int. Cl.
*B65G 53/28* (2006.01)

(52) U.S. Cl. .................. 406/106; 406/143; 406/146; 406/197

(58) Field of Classification Search .......... 406/106, 406/143, 146, 197
See application file for complete search history.

(56) References Cited

U.S. PATENT DOCUMENTS

| | | | |
|---|---|---|---|
| 3,642,495 A | 2/1972 | Davidson et al. | 99/100 |
| 3,722,401 A | 3/1973 | Davidson et al. | 99/407 |
| 3,799,620 A | 3/1974 | Robinson et al. | 302/15 |
| 3,887,074 A | 6/1975 | Bausier | 209/158 |
| 4,335,994 A | 6/1982 | Gurth | 415/90 |
| 4,549,478 A | 10/1985 | Entes | 99/536 |
| 5,042,342 A | 8/1991 | Julian | 83/98 |
| 5,174,181 A | 12/1992 | Julian et al. | 83/24 |
| 5,179,881 A | 1/1993 | Frey et al. | 83/98 |
| 5,266,120 A | 11/1993 | Dambrine | 127/44 |
| 5,343,791 A | 9/1994 | Julian et al. | 83/865 |
| 5,711,980 A | 1/1998 | Terry | 426/392 |
| 6,029,853 A * | 2/2000 | Kubo et al. | 222/1 |
| 6,213,308 B1 | 4/2001 | Bajema | 209/172.5 |
| 6,293,407 B1 | 9/2001 | Bajema | 209/495 |
| 7,137,325 B2 | 11/2006 | Bajema et al. | 83/42 |

FOREIGN PATENT DOCUMENTS

| | | |
|---|---|---|
| EP | 0 343 756 | 5/1989 |
| EP | 0 377 451 | 1/1990 |
| WO | 80/00471 | 3/1980 |

* cited by examiner

*Primary Examiner*—Douglas A Hess
(74) *Attorney, Agent, or Firm*—Westman, Champlin & Kelly, P.A.

(57) ABSTRACT

A method of transporting tuberous vegetables from a storage facility that is remote from a processing facility to a processing facility includes providing a pipeline from the storage facility to the processing facility. A sufficient amount of water is continuously fed into a pump inlet along with a continuous selected amount of tuberous vegetables such that a pump, located proximate the storage facility, forces the water along with the tuberous vegetables through the pipeline and discharges the water and tuberous vegetables to the processing facility where the processing facility separates the water from the tuberous vegetables.

9 Claims, 3 Drawing Sheets

METHOD OF TRANSPORTING TUBEROUS VEGETABLES

FIELD OF THE INVENTION

The present invention relates to a method of transporting tuberous vegetables. More particularly, the present invention relates to a method of pumping tuberous vegetables through a pipeline from a storage facility to a processing facility.

BACKGROUND OF THE INVENTION

Many tuberous vegetables, such as sugar beets having the scientific name Beta Vulgaris, are harvested from fields and transported to a storage facility that is remote from a processing facility. Because sugar beets must be harvested in a relatively short amount of time, the time between when the sugar beets have finished growing until the first freeze, the processing facilities typically do not have adequate capacity to process all of the harvested crops during the harvest season. Therefore, the storage facilities are necessary to provide an area for the harvesters to safely store the sugar beets until the processing facility has sufficient capacity to process the harvested crop.

Typically, the sugar beets are transported from the field to the storage facility utilizing trucks which then dump the harvested goods on a concrete pad. As capacity becomes available within the processing facility, the sugar beets are then transported to the processing facility utilizing trucks such as semi tractor-trailers. However, due to the rising fuel costs, a significant amount of the farmer's profit can be consumed in transportation costs from the storage facility to the processing facility.

SUMMARY OF THE INVENTION

The present invention includes a method of transporting tuberous vegetables from a storage facility that is remote from a processing facility to a processing facility. The method includes providing a pipeline from the storage facility to the processing facility. A sufficient amount of water is continuously fed into a pump inlet along with a continuous selected amount of tuberous vegetables such that a pump, located proximate the storage facility, forces the water along with the tuberous vegetables through the pipeline and discharges the water and tuberous vegetables to the processing facility where the processing facility separates the water from the tuberous vegetables.

DETAILED DESCRIPTION OF ILLUSTRATIVE EMBODIMENTS

Figure 1:
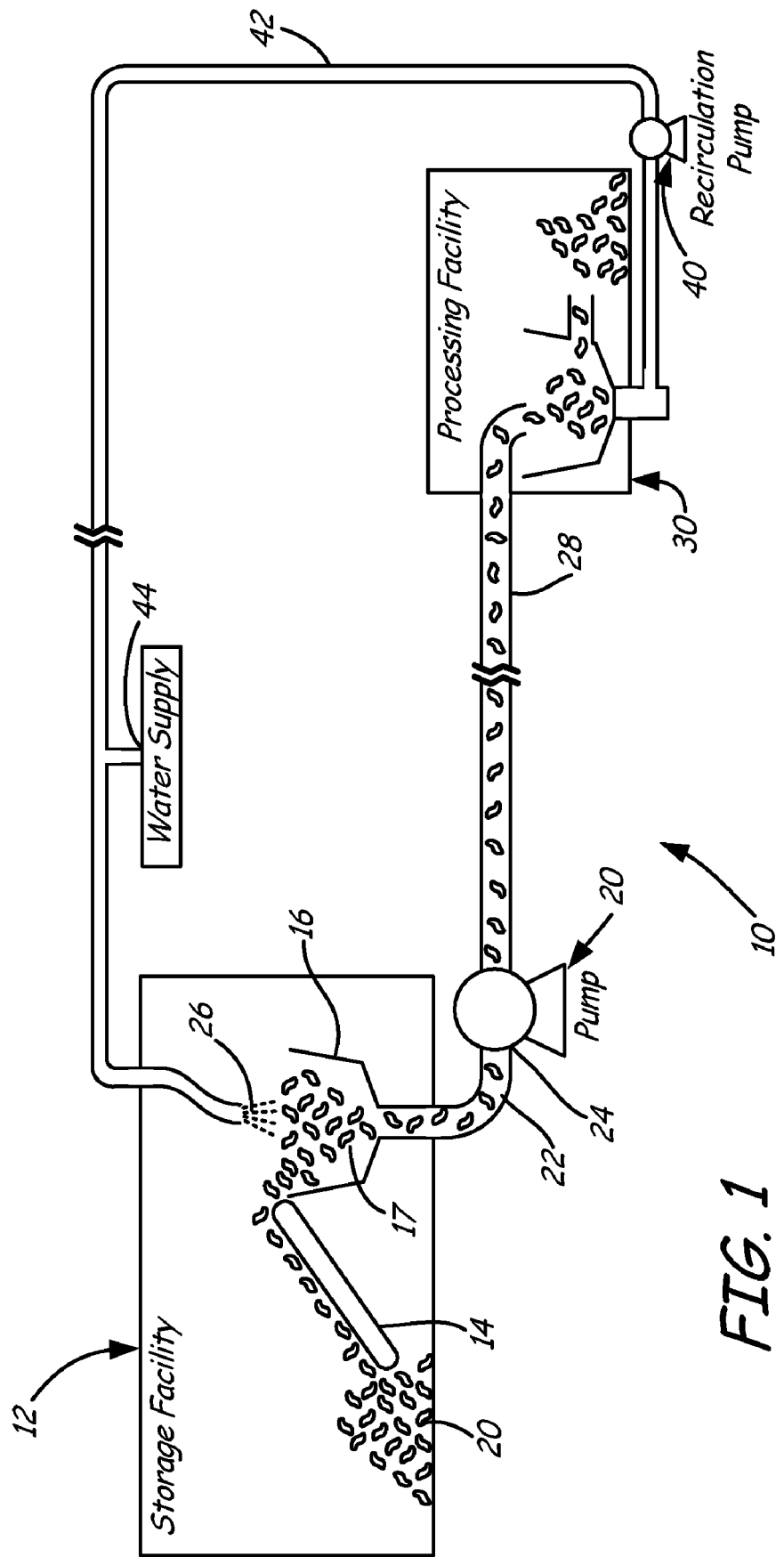
FIG. 1 is a schematic diagram of the transportation of the tuberous vegetables from a storage facility to a processing facility using a conveyor for transferring the tuberous vegetables into the inlet of a pump.
Figure 3:
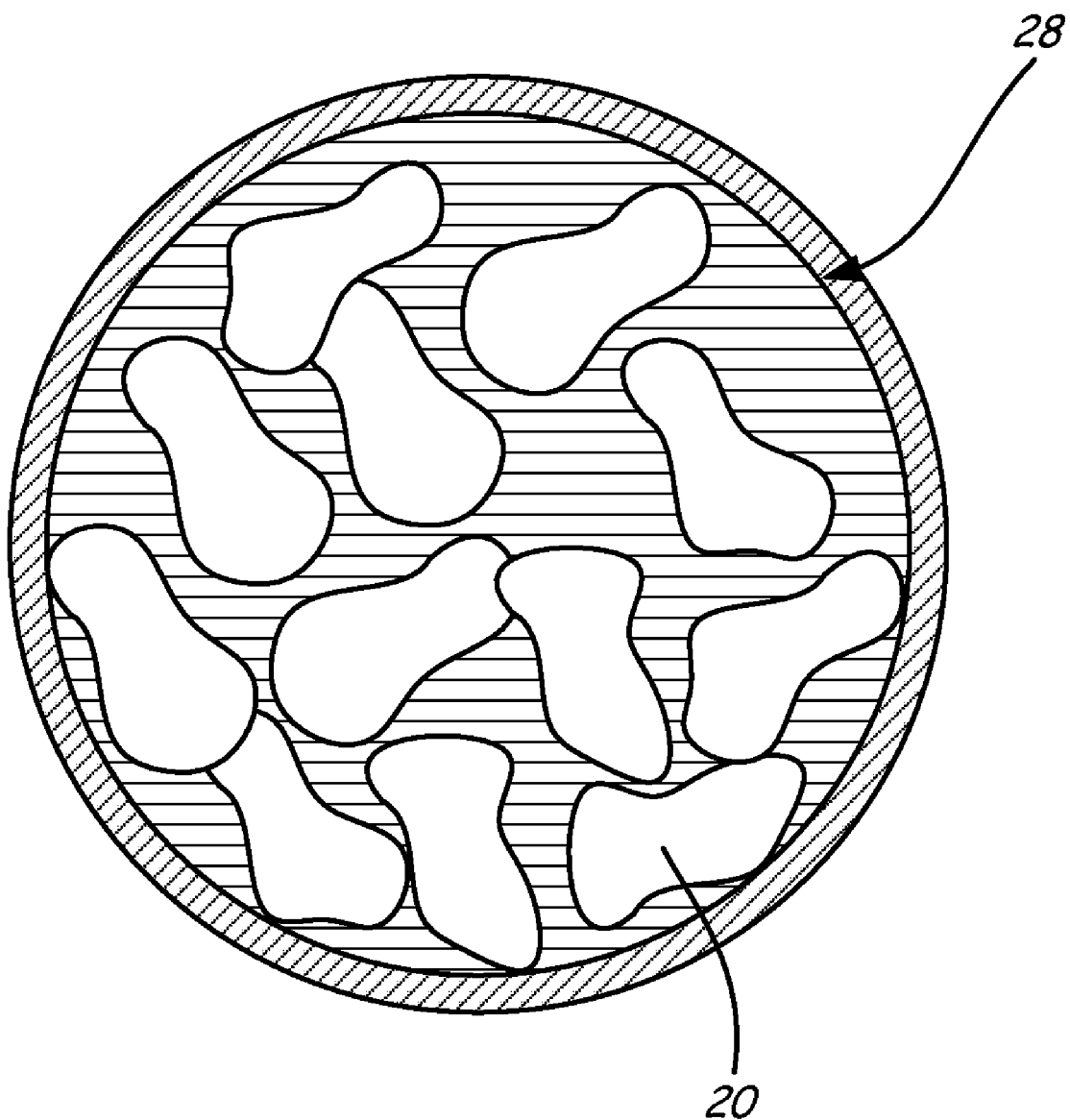
FIG. 3 is a sectional view of the pipeline containing water and tuberous vegetables.

A method of pumping tuberous vegetables from a storage facility to a processing facility is generally indicated in FIG. 1 at 10. The method utilizes a pipeline to transport the tuberous vegetables 20 to the processing facility in an aqueous slurry, as best illustrated in FIG. 3.

At a storage facility 12, the tuberous vegetables 20 are typically conveyed into a hopper 16 with a conveyor 14. The hopper 16 includes an opening 17 that discharges into an inlet piping 22 connected to an inlet 24 of a pump 26. The inlet piping 22 has a sufficient diameter to allow the tuberous vegetables to pass into the inlet 24 of the pump 26.

A supply of water 26 is also fed into the pump inlet 22 where both a selected amount of water and a select amount of tuberous vegetables 20 enter into an inlet 24 of a pump 26. The pump 26 forces the tuberous vegetables along with the water through a pipeline 28 to a processing facility.

The pipeline 28 discharges the tuberous vegetables 20 and the water at the processing facility 30 where the water is separated from the tuberous vegetables 20. The water is recirculated back to the hopper via a recirculating pump 40 through a return pipeline 42. Because water is lost at the processing facility, a water supply makeup line 44 adds water into the return pipeline 42 to maintain a proper amount of water in the system such that the tuberous vegetables 20 are transported from the storage facility 12 to the processing facility without being damaged.

The pipeline 30 typically is constructed of a polyvinyl chloride (PVC) polymer or a polyethylene polymer and has a diameter of between about 24 and 48 inches. Metal and concrete pipelines are also considered.

Parallel pipelines are also considered. A single pump or more than one pump connected parallel to the pipeline 28 are also considered. One parallel pump can be utilized as a backup in the event the other pump malfunctions. More than one pump connected in parallel to the pipeline 28 can be utilized to increase the flow rate through the pipeline 28.

The pump 20 is typically a positive displacement piston-style pump having an inlet sufficient to allow multiple tuberous vegetables to be processed through the pump in a single stroke. The pump is capable of pumping the tuberous vegetables and the water at a rate of about 2 feet per second. However a flow rate of up to 10 feet per second is also considered. Any flow rate that effectively transports the tuberous vegetables from the storage facility 12 to the processing facility 30 without damaging the tuberous vegetables is also considered. Because the driver powering the pump 20, which may either be a combustion engine or an electric motor, is more efficient than utilizing semi tractor trailers, a cost savings is realized due to the reduction in energy consumption and wear on the vehicles.

Figure 2:
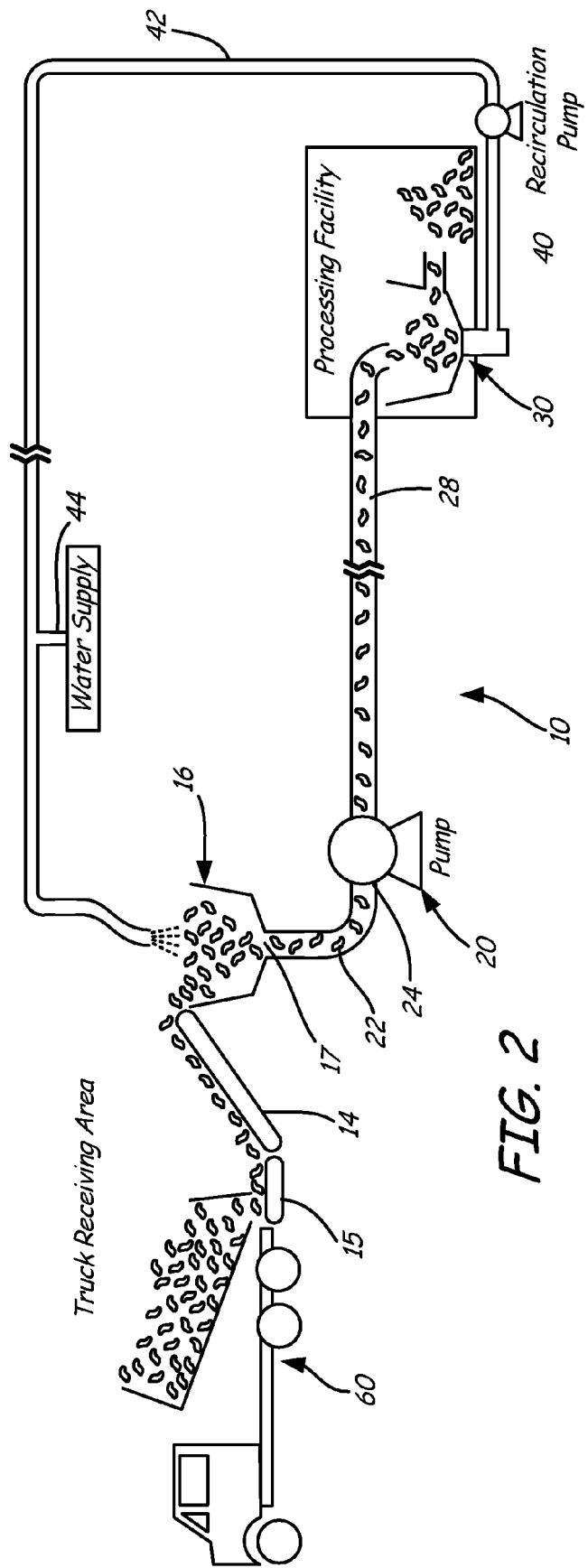
FIG. 2 is a schematic diagram of a method of transporting tuberous vegetables from a truck receiving area to a processing facility utilizing the pipeline and a pump where the truck deposits the tuberous materials onto a conveyor that moves the tuberous vegetables into the inlet of the pump.

Referring to FIG. 2, an alternative conveyor system may be utilized where trucks 60 that transport the tuberous vegetables from the fields to the storage facility are positioned proximate a hopper 15 where the truck 60 unloads the tuberous vegetables onto the conveyor hopper 15, where the conveyor hopper 15 transports the tuberous vegetables to the conveyor 14 and into the inlet 24 of the pump 20. The pump 20 then forces the tuberous vegetables through the pipeline 28 to the processing facility 30.

Although the present invention has been described with reference to preferred embodiments, workers skilled in the art will recognize that changes may be made in form and detail without departing from the spirit and scope of the invention.

What is claimed is:

1. A method of transporting tuberous vegetables from a storage facility to a processing facility, the method comprising:

providing a pipeline between the storage facility and the processing facility;

providing a pump having a discharge port attached to the pipeline proximate the storage facility; and providing water and tuberous vegetables into an inlet of the pump such that the tuberous vegetables along with the water is transported to the processing facility.

2. The method of claim 1 and further comprising:

separating the water and the tuberous vegetables at the processing facility; and recirculating the water back to the inlet of the pump.

3. The method of claim 2 and further comprising recirculating the water separated from the tuberous vegetables back into the inlet of the pump.

4. The method of claim 1 and further comprising:

providing a hopper attached to the inlet of the pump; and disposing the water and the tuberous vegetables into the hopper.

5. The method of claim 4 and further comprising conveying the tuberous vegetables into the hopper utilizing a conveyor.

6. The method of claim 5 and further comprising utilizing a truck to place the tuberous vegetables on the conveyor.

7. The method of claim 6 and further comprising providing makeup water to maintain the selective amount of water that is provided into the inlet of the pump.

8. The method of claim 1 and wherein the pump transfers the tuberous vegetables and water to the processing facility at a flow rate effective to not damage the tuberous vegetables.

9. The method of claim 1 wherein the tuberous vegetables along with the water are transported at a rate of at least 2 feet per second within the pipeline.

\* \* \* \* \*

UNITED STATES PATENT AND TRADEMARK OFFICE
CERTIFICATE OF CORRECTION

PATENT NO. : 7,674,077 B2
APPLICATION NO. : 11/949894
DATED : March 9, 2010
INVENTOR(S) : Michael Opatril It is certified that error appears in the above-identified patent and that said Letters Patent is hereby corrected as shown below:

In the claims:

Claim 1, column 3, line 2: Please change "pipeline proximate the storage facility; and" to read
-- pipeline proximate the storage facility; --

Claim 1, column 3, lines 4 and 5: Please change "pump such that the tuberous vegetables along with the water is tranported to the processing facility" to read as follows:
-- pump; and
   discharging the tuberous vegetables and water through the discharge port of the pump and into the pipeline, such that the tuberous vegetables along with the water are under pressure and transported to the processing facility. --

Signed and Sealed this

Twenty-seventh Day of July, 2010

David J. Kappos
*Director of the United States Patent and Trademark Office*